(12) United States Patent
McEwan

(10) Patent No.: US 6,914,552 B1
(45) Date of Patent: Jul. 5, 2005

(54) MAGNETO-RADAR DETECTOR AND METHOD

(75) Inventor: Thomas E. McEwan, Las Vegas, NV (US)

(73) Assignee: The Regents of the University of California, Oakland, CA (US)

( * ) Notice: Subject to any disclaimer, the term of this patent is extended or adjusted under 35 U.S.C. 154(b) by 158 days.

(21) Appl. No.: 10/606,388

(22) Filed: Jun. 25, 2003

(51) Int. Cl.$^7$ .......................... G01S 13/04; G01S 13/56
(52) U.S. Cl. .......................... 342/22; 342/27; 342/28; 342/193
(58) Field of Search .................. 342/22, 27, 28, 342/192, 193

(56) References Cited

U.S. PATENT DOCUMENTS

| | | | |
|---|---|---|---|
| 5,334,981 A | | 8/1994 | Smith et al. |
| 5,512,834 A | * | 4/1996 | McEwan ............... 342/642 |
| 5,543,799 A | | 8/1996 | Heger |
| 5,592,170 A | | 1/1997 | Price et al. |
| 5,757,320 A | | 5/1998 | McEwan |
| 5,774,091 A | | 6/1998 | McEwan |
| 5,805,110 A | | 9/1998 | McEwan |
| 5,854,603 A | | 12/1998 | Heger |
| 5,867,257 A | * | 2/1999 | Rice et al. ............. 356/28.5 |
| 5,883,591 A | | 3/1999 | McEwan |
| 5,896,102 A | | 4/1999 | Heger |
| 6,216,540 B1 | * | 4/2001 | Nelson et al. .......... 73/633 |
| 6,344,818 B1 | * | 2/2002 | Markov ................. 342/22 |
| 6,359,582 B1 | * | 3/2002 | MacAleese et al. ...... 342/22 |
| 6,720,905 B2 | * | 4/2004 | Levitan et al. .......... 342/22 |
| 6,777,684 B1 | * | 8/2004 | Volkov et al. ......... 250/341.1 |

FOREIGN PATENT DOCUMENTS

| | | |
|---|---|---|
| WO | WO 98/08115 A1 | 2/1998 |
| WO | WO 98/12573 A1 | 3/1998 |

OTHER PUBLICATIONS

"Concealed weapon detection using microwave and millimeter wave sensors", McMillan, R.W.; Currie, N.C.; Ferris, D.D., Jr.; Wicks, M.C, ICMMT '98, Aug. 18–20, 1998 Ps:1–4.*

* cited by examiner

*Primary Examiner*—John B. Sotomayor
(74) *Attorney, Agent, or Firm*—Michael C. Staggs; Alan H. Thompson

(57) ABSTRACT

A varying magnetic field excites slight vibrations in an object and a radar sensor detects the vibrations at a harmonic of the excitation frequency. The synergy of the magnetic excitation and radar detection provides increased detection range compared to conventional magnetic metal detectors. The radar rejects background clutter by responding only to reflecting objects that are vibrating at a harmonic excitation field, thereby significantly improving detection reliability. As an exemplary arrangement, an ultra-wideband micropower impulse radar (MIR) is capable of being employed to provide superior materials penetration while providing range information. The magneto-radar may be applied to pre-screening magnetic resonance imaging (MRI) patients, landmine detection and finding hidden treasures.

20 Claims, 4 Drawing Sheets

60 Hz without a metal object

60 Hz with a metal object

MAGNETO-RADAR DETECTOR AND METHOD

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to radar systems and methods, and more particularly to a method employing radar to locate a magnetically excited object.

2. Description of Related Art

Electronic detection of metal objects, particularly hidden metal objects, traditionally involves a "metal detector" that includes an electromagnetic loop coupled to an oscillator and detector. When the loop is placed near a metal object, its inductance changes and produces a change in the oscillator's frequency, which is detected. Modern versions of this technique employ pulse methods. In either case, detection range is sharply limited by a third power decrease in magnetic field strength versus range to the target. Since the magnetic field must travel out to the object and then couple back to the loop, a sixth order decrease in signal strength versus range results, forming a formidable limitation to long range operation.

Historically, radar has been used to sense mechanically excited motion or vibration in objects, such as rotating aircraft turbine blades. U.S. Pat. No. 6,492,933, entitled "SSB Pulse Doppler Sensor And Active Reflector System," to McEwan, patented Dec. 10, 2002, describes a radar sensor that senses mechanically induced vibrations, wherein the mechanical vibrations may be the result of mechanical, acoustic, magnetic, optical, or electromagnetic excitation.

Background information on a radar motion sensor utilizing ultra-wideband radar is contained in U.S. Pat. No. 5,361,070, entitled "Ultra-Wideband Radar Motion sensor," to McEwan, patented Nov. 1, 1994, including the following: "[u]ltra-wideband (UWB) radar motion sensing is a completely new approach to motion sensor technology. UWB radar operates as a pulse-echo system that docks the two-way time of flight of a very short electrical pulse. A carrier frequency is not used; instead, an electrical voltage pulse is applied directly to the antenna."

Background information on a radar means for monitoring and imaging the movement of intra-body organs, tissues, and other structures and foreign objects embedded in a human or animal body is contained in U.S. Pat. No. 5,573,012, entitled "Body Monitoring And Imaging Apparatus And Method," to McEwan, patented Nov. 12, 1996, including the following: "the invention is based on the pulse-echo radar principle of docking the two-way time of flight of an electromagnetic pulse. As used herein, the term radar impulse refers to a short radiated pulse, which replaces the long sinusoidal burst used in conventional radar technology. There is no specific frequency associated with impulse radar; rather, its frequency spectrum is related by the Fourier transform of the pulse."

None of the prior art radar systems disclose a radar system tuned for optimal sensitivity of magnetically excited metal objects. Accordingly, a need exists for an accurate and sensitive method and system for radar detection of magnetically excited materials that includes ferrous and nonferrous materials. This new method and system is relatively inexpensive, easy to use by non-professional operators and is capable of being implemented in a variety of commercial and non-commercial applications.

SUMMARY OF THE INVENTION

The present invention is directed to a method of detecting a mechanically excited object at a harmonic frequency of a varying magnetic field utilizing radar motion sensors.

Another aspect of the present invention is directed to an apparatus for detecting a mechanically excited object at a harmonic frequency of a varying magnetic field utilizing radar motion sensors.

The present invention provides a system and method capable of detecting objects, such as, ferrous and/or non-ferrous materials capable of having an induced eddy current. For example, the present invention can potentially be used to screen patients prior to Magnetic Resonance Imaging (MRI), e.g., detect needles that may have been misplaced during surgical procedures. The system can potentially track the location of a catheter inserted within a patient undergoing medical endoscopy, urethrascopy an/or cystoscopy. It may be capable of detecting the perturbation of bio-materials, such as saline along the optic nerve. It may also be implemented as a sensitive metal detector for use in treasure hunting and/or to detect dangerous objects such as mines in a battlefield or conductive explosive materials.

Accordingly, the present system and method provides a desired portable, cost effective, non-invasive arrangement, capable of detecting objects in a variety of commercial and non-commercial applications.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
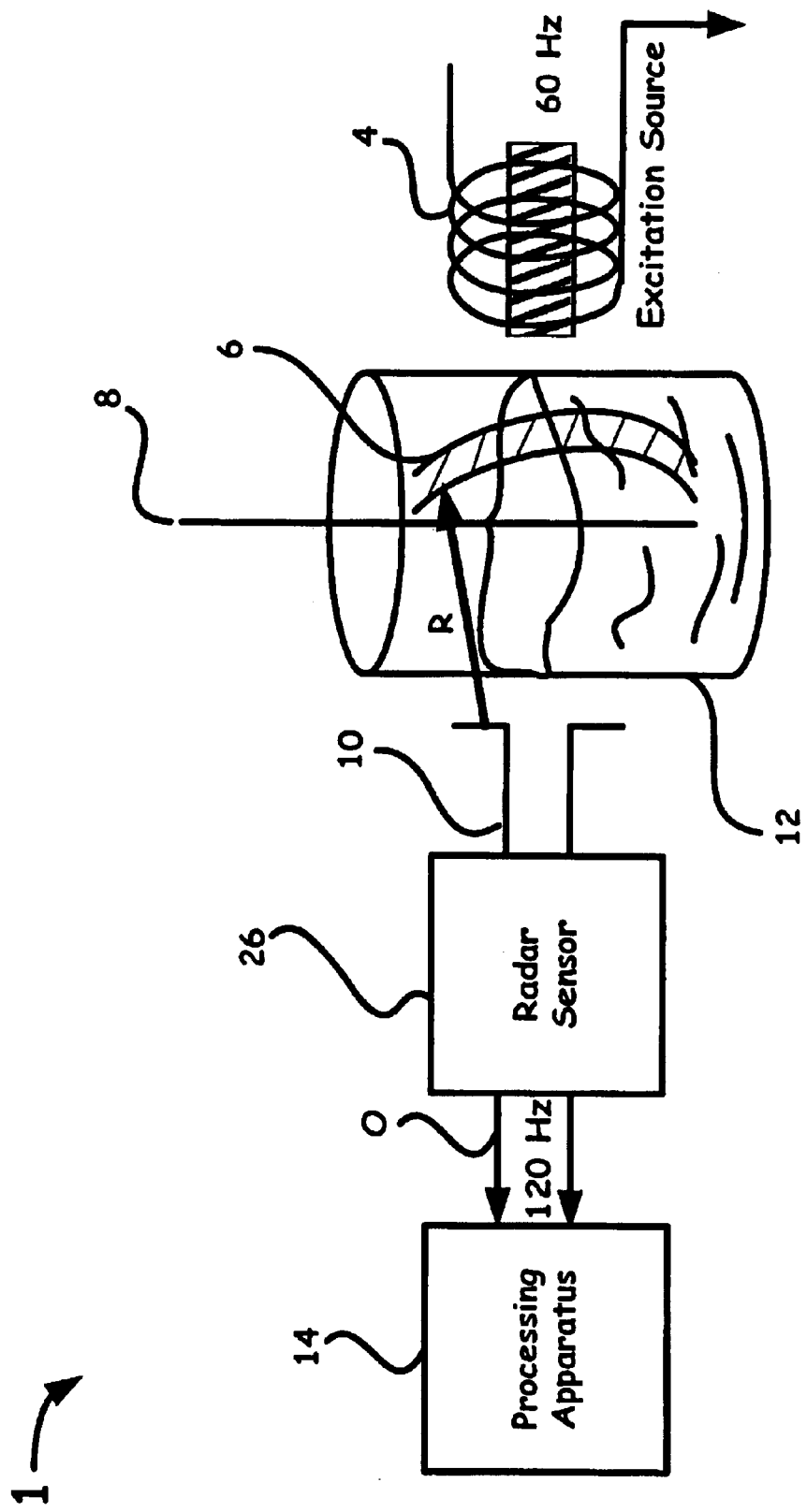
FIG. 1 is a general block diagram of a hidden object detection system.

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value; however, inherently contain certain errors necessarily resulting from the standard deviation found in their respective testing measurements.

General Description

The present invention is based on magnetically induced mechanical excitation of hidden objects, such as, but not limited to, conductive bio-materials, conductive ceramics, conductive explosives, and/or ferrous and nonferrous materials by transmitting a (e.g., sinusoidal) magnetic field and then sensing such excitation (e.g. a resultant mechanical vibration) by radar. Ferrous materials, in particular, are readily detected and nonferrous materials are detected due to the eddy currents induced by the magnetic field applied to any conductive material. The radar sensor can be a conventional CW Doppler radar, a pulsed Doppler radar, or a UWB radar, such as an impulse radar. Any radar capable of detecting small mechanical vibrations may be employed, with pulsed CW, impulse radars and modulated CW radars having the advantage of providing range information. An impulse radar is a beneficial embodiment since impulse radar exhibits sensing within a sharply bounded range, i.e., it is range gated. Range gated radars reject clutter outside the gated region and are generally preferred over non-gated radar such as CW Doppler. In addition, range gated radars provide valuable range-to-object information. It is understood that any type of radar capable of detecting motion or vibration induced by magnetic excitation can be used in combination with harmonic processing to detect an object.

Impulse radar radiates a "video", or a baseband pulse (i.e., frequencies equal to the modulation, or intelligence carrying frequencies) rather than the usual sinusoidal burst found in conventional radar. The pulses are just a sequence of impulses; there is no carrier. There is no specific frequency associated with this radar; rather, its frequency spectrum is related by the Fourier transform of the pulse. The free-space radiated radar pulse typically resembles a Gaussian-shaped impulse having a pulse-width of about 5 ns or less, often about 1 ns or less, and more often about 200 picoseconds wide. It is beneficial that impulse radar has a spectrum located as close to DC as possible, where materials attenuation is the lowest.

By transmitting interrogating pulses as UWB radar pulses and then opening an electronic gate operationally connected to a receive antenna, sample motion of the mechanically vibrating material is capable of being detected. Specifically, when the magnetic excitation varies sinusoidally at a frequency F, the resulting vibration of an object responding to such an excitation occurs at a harmonic frequency, such as, but not limited to, 2F, to provide a unique motion signature that is detected by the present invention using UWB or other radar techniques.

The second harmonic is generally the dominant frequency of interest, but other detectable harmonics can arise from system nonlinearities. In the case of a harmonic rich excitation source, i.e., a non-sinusoidal source, harmonics will naturally appear at the output of the apparatus, with a strong emphasis on the even harmonics due to the unsigned magnitude response of the object's vibration to the bipolar magnetic excitation. Harmonic analysis of the output from the radar sensor may be employed to provide information about the object, particularly its size.

The excitation source may operate at several simultaneous frequencies at once, e.g., from between about 10 and about 60 Hz, with detectable harmonics at about 20 and about 120 Hz. Intermodulation distortion due to system nonlinearities will generate new frequencies, including, for example, about 100 and about 140 Hz. These new frequencies may be filtered for various purposes such as classifying materials or screening out false detection positives from certain materials or electric/magnetic interference.

The excitation frequency may be swept with the system processor responsive to detected harmonic magnitude. Peaks in harmonic magnitude can be used to determine resonances in the object, wherein the resonant frequencies and quality (Q) factors can provide information about the size, shape and composition of an object or the material the object is embedded in. Alternatively, pulsed magnetic excitation may be used with suitable post detection processing. For either swept frequency or pulsed magnetic excitation, suitable processing well-known in the art can be applied to provide an analysis of the characteristics of the magnetically excited, vibrating object.

The magnetic excitation source is generally an electromagnet but may also be a moving magnet.

Since the detected radar output is the result of the interaction of mechanical vibrations and electromagnetic waves, which are generally sinusoidal, i.e., not linear, nonlinear distortion can occur in the shape of the detected radar output signal. Distortion and detection nulls can be mitigated using quadrature radar, such as discussed, for example, in the aforementioned U.S. Pat. No. 6,492,933.

Various radar modes may be employed to detect the magnetically induced vibrations: CW-Doppler, pulsed CW, UWB pulse-echo, FMCW, etc. While each mode may offer a particular set of advantages, most applications will benefit from a range gated radar, which provides range-to-object information while screening out clutter from objects outside its range gated region. Pulse echo radars provide range-gating in a simple implementation.

A beneficial sensor is based on the pulse-echo radar principle of docking the two-way time of flight of an electromagnetic pulse and is described in U.S. Pat. No. 5,361,070, issued Nov. 1, 1994 titled "Ultra-Wideband Radar Motion Sensor," by McEwan, which is fully incorporated herein by reference. The radar receiver described in the Ultra-wideband Motion sensor patent incorporated above, is further described in U.S. Pat. No. 5,345,471, issued Sep. 6, 1994, titled "Ultra-Wideband Radar Motion Receiver," by McEwan, which is also fully incorporated herein by reference. A UWB motion detector that modulates an oscillator to produce a tone that corresponds to a heart motion is described in U.S. Pat. No. 5,573,012, issued Nov. 12, 1996 titled "Body Monitoring And Imaging Apparatus And Method," by McEwan, is additionally fully incorporated herein by reference. Impulse radars based on design principles seen in the '070 patent can be configured to operate at extremely low DC input power levels and have been termed "Micropower Impulse Radar" or MIR.

Specific Description

The MIR detection process utilizes a repeated Pulse Rate Interval (PRI) of between about 10 MHz and about 10 KHz, more often a PRF of about 1 MHz. The system and method is capable of averaging two or more pulses, more often, however, between about 1,000 and about 10,000 pulses are capable of being averaged. For example, at a PRF of about 1 MHz, such a system and method as disclosed in the present invention allows about 10,000 received pulses to be averaged to reproduce the harmonic signature frequency, e.g. twice the excitation source's frequency, of the mechanically excited object hidden or otherwise prior to driving ancillary equipment, such as, but not limited to, a signal display or an alarm. The high level of averaging reduces the random noise accompanying the sampled signal to such an extent that extremely low amplitude signals can be detected.

The averaged (i.e., integrated) pulses provide a voltage level that corresponds to the frequency of the mechanically moving object at a range defined by the delay between the emitted pulse and the time of gating, or operating a sampler circuit cooperating with the receive antenna. This process is referred to as range gating, and provides depth information about an object that is being scanned for mechanical motion.

Turning now to the drawings, FIG. 1 illustrates a basic configuration of a system of the present invention and is designated generally by the reference numeral 1. System 1 includes, at least one electromagnet 4 or a source, such as, a moveable permanent magnet, capable of generating a time varying magnetic field, and a radar sensor 26, such as described in, for example, U.S. Pat. No. 5,361,070 and/or U.S. Pat. No. 5,573,012 as discussed above, positioned such that a harmonic mechanical vibration frequency of object 8 can be located in, for example, beneath the surface of the earth, or within a human or animal body. Antenna 10 radiates energy from radar sensor 26 to object 8 and receives reflected modulated energy back from object 8. Radar sensor 26, often a radar sensor known to those skilled in the art, such as CW radar and/or pulsed radar capable of detecting motion within the design parameters of the present invention, but more often MIR radar, couples the received reflected energy for detection of the modulation induced by vibrating object 8.

As an example, object 8, such as, a ferrous rod, can be inserted into container 12 filled with water, as shown in FIG. 1, which simulates a material, such as, a metal object within a human body. Electromagnet 4, such as, for example, a bulk tape eraser, is electrically driven sinusoidally in this example at 60 Hz, at a predetermined voltage and current, which results in a slight 120 Hz vibration of object 8. The vibration is about the same amplitude whether object 8 is in or out of container 12 filled with water. Radar sensor 26, such as an MIR radar sensor as disclosed in U.S. Pat. No. 5,361,070 and/or U.S. Pat. No. 5,573,012 as discussed above, is positioned on a predetermined side of container with its range, as denoted by R with the accompanying directional arrow, of up to at least about 12" set to include a predetermined volume 6 of water-filled container 12 but not necessarily electromagnet 4. For clarity, volume 6 is shown not include object 8; in practice, volume 6 is centered on object 8 by adjustment of the range gate of radar 26. Radar sensor 26 then detects the mechanical movement of object 8 and outputs a signal, as denoted by the letter O that includes a harmonic frequency, which is often the second harmonic of the initial excitation frequency. Thereafter, processing apparatus 14, such as, but not limited to, comparator circuits, analog indicators, and/or spectral analyzing apparatus known in the art can operationally receive output O from radar sensor 26 such that quantitative and/or qualitative analysis can provide information of a potentially hidden object 8.

Alternatively, excitation source 4 may be driven by two frequencies simultaneously, such as, for example, about 10 Hz and about 60 Hz, and radar sensor 26 output 0 may contain intermodulation products of the harmonic frequencies, such as about 100 and about 140 Hz, as well as the harmonics at about 20 and about 120 Hz. These intermodulation products are the result of nonlinearities throughout system 1 and may be used to indicate a parameter of object 8, particularly if object 8 were composed of an elastic material.

Figure 2A:
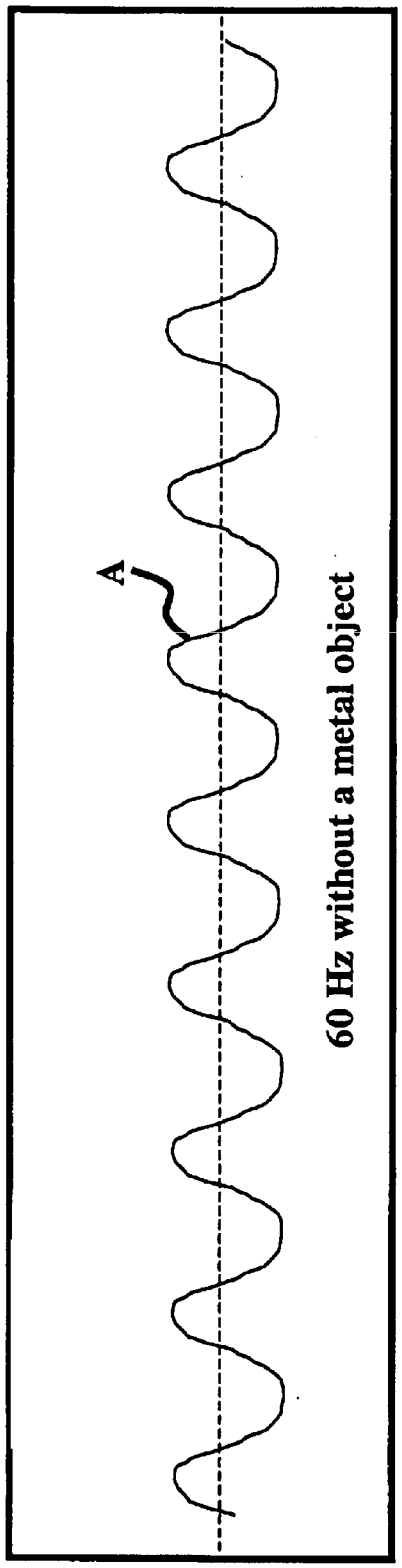
FIG. 2A shows an example waveform without a metal object.

FIG. 2A shows an example MIR output without object 8 in container 12 as shown in FIG. 1. The example 60 Hz sinewave output, denoted as A, is primarily due to electrostatic coupling with a smaller component due to direct flux linkage from the electromagnet that can be eliminated with simple shielding around the MIR circuitry.

Figure 2B:
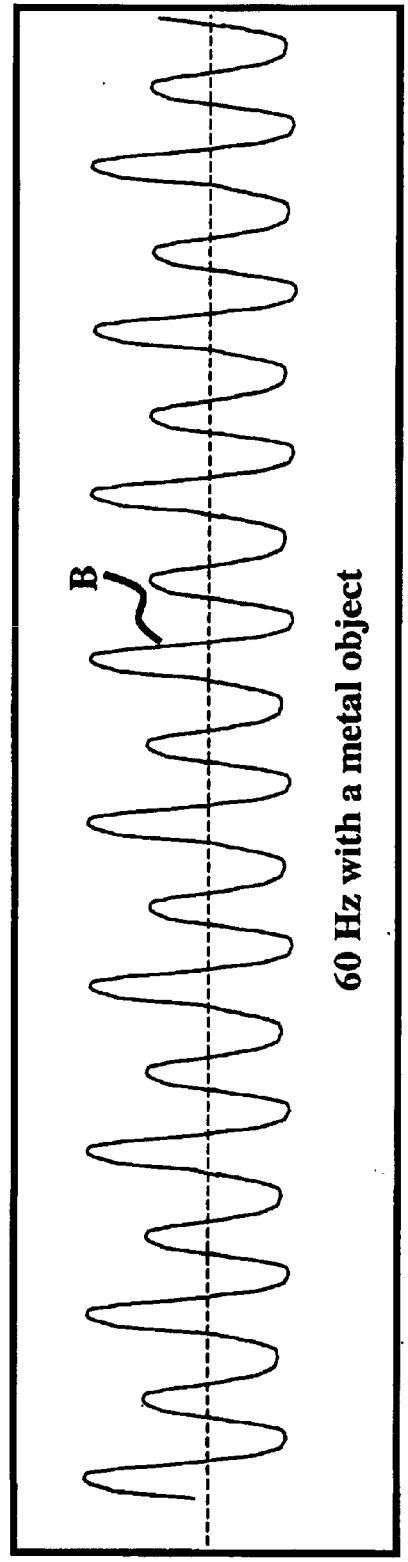
FIG. 2B shows an example waveform with a metal object.

FIG. 2B shows MIR radar sensor 26 output with object 8 inserted into container 12. FIG. 2B thus produces a 120 Hz sinewave, denoted as B, which is a result of the presence of object 8, which is superimposed on the 60 Hz output, as shown in FIG. 2A. Sinewave B, which is a second harmonic of sinewave output A, as shown in FIG. 2A, (i.e., 120 Hz is the second harmonic of an excitation frequency of 60 Hz) occurs because object 8, such as a metal, is attracted to the field produced by the electromagnet on either side of the AC cycle to produce such a frequency doubling.

Figure 3:
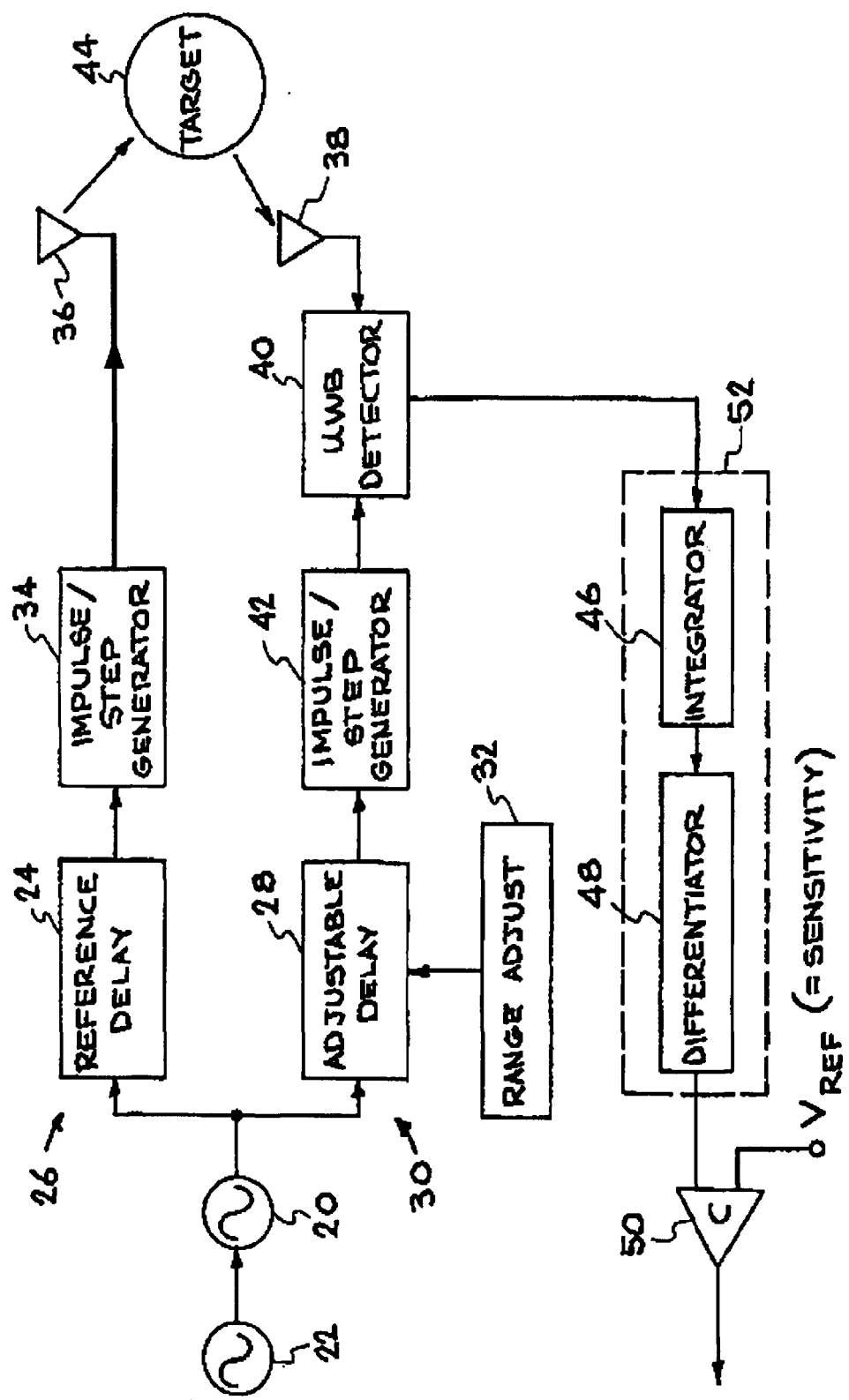
FIG. 3 shows a block diagram of an MIR motion sensor.

FIG. 3 illustrates an exemplary radar motion sensor 26, as described in, U.S. Pat. No. 5,361,070, titled, "Ultra-Wideband Radar Motion Sensor." In system 26, a free-running oscillator (PRF generator) 20 generates a radar pulse repetition frequency (PRF). A noise generator 22 is connected to PRF generator 20 to introduce a random variation to the PRF, for purposes as described in U.S. Pat. No. 5,361,070. The output of PRF generator 20 drives two delay means, a fixed reference delay 24 in the transmit path 26, and an adjustable delay 28 in the receiver (gating pulse) path 30. Adjustable delay 28 is adjusted by a range adjustment means 32.

Fixed reference delay 24 is generally set to match the minimum delay in receive path 30, and may also be set to account for delays in the antenna feed lines, etc. The output of fixed reference delay 24 drives an impulse (or step)

generator 34 which provides the transmit pulse. If PRF generator 20 or fixed reference delay 24 produce a pulse with a sufficiently fast rise time, then impulse (or step) generator 34 may be omitted. Otherwise, generator 34 is used to generate a suitable transmit pulse.

The transmit pulse is directly radiated by a transmit antenna 36. There are several UWB antennas in common use, the most common of which is the tapered slot antenna, also known as an endfire antenna. In example embodiments that may be implemented by the present invention, both simple wire dipoles and broader band "bow-tie" dipoles are used.

Since many antennas exhibit increasing gain with increasing frequency, a step input applied to the transmit antenna results in the radiation of the derivative of the step, i.e., an impulse.

A receive antenna 38 is connected to a UWB detector (receiver or sampler) 40. Sampler 40 is gated or strobed by the output of adjustable delay 28 through impulse (or step) generator 42, thus causing sampler 40 to sample a point in space corresponding to the two-way echo time to an object. UWB detector 40 averages detected pulses across multiple PRF's. The output of the UWB detector 40 is averaged in an integrator 46 with a time constant that is typically longer than the PRI of the radar. This average value represents the sum of the radar reflections and other radar clutter, such as direct antenna to antenna coupling. If the radar reflectivity changes at the range being sampled, the average will change and this change is sensed by a differentiator 48 and output, as denoted by a comparator circuit 50, to operationally coupled circuitry (not shown).

Figure 4:
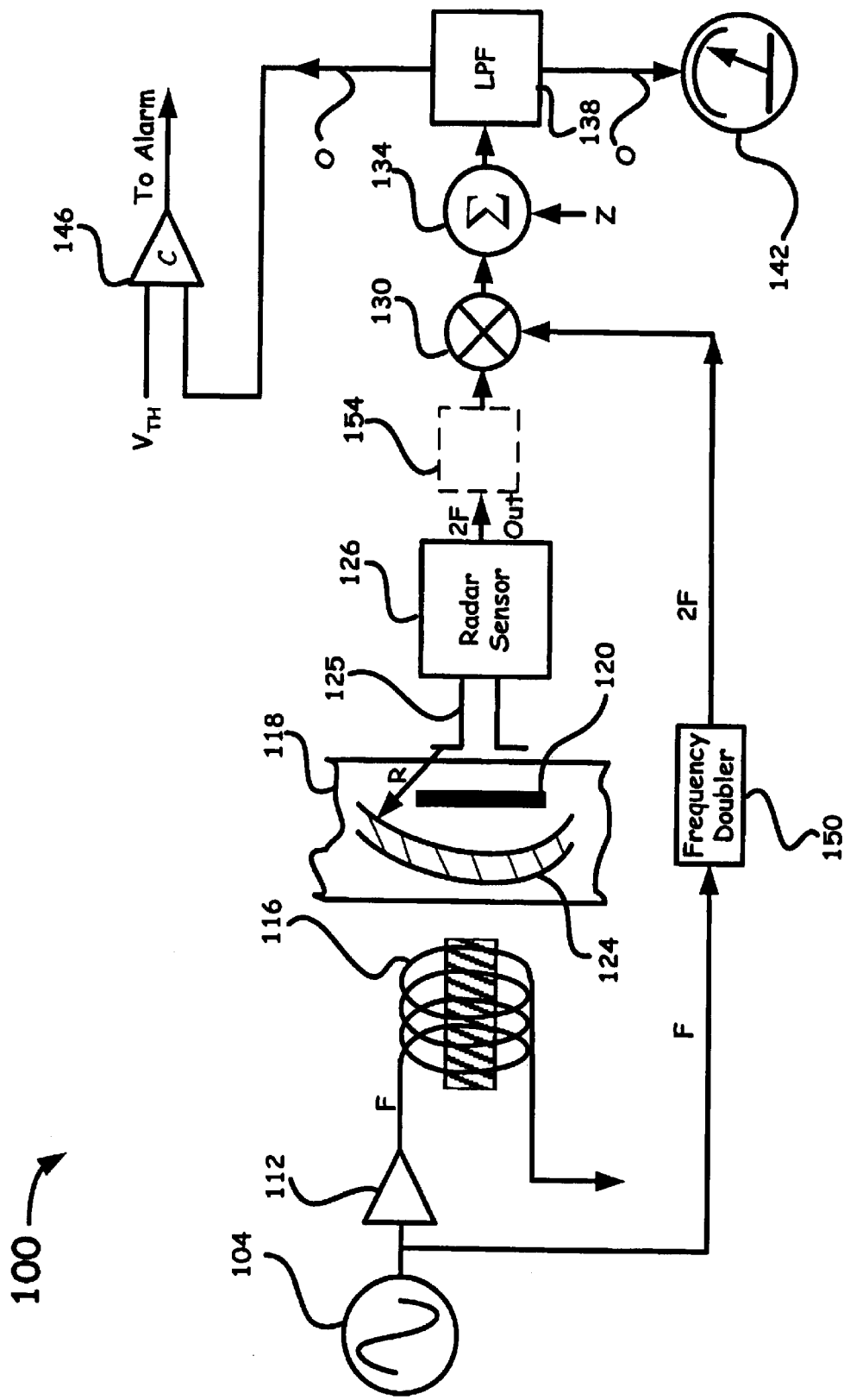
FIG. 4 shows a basic block diagram of an entire Magneto-Radar detection system.

FIG. 4 is an illustrative example of a complete detection system, generally designated by the reference numeral 100. System 100 includes a generator 104 to provide modulation to a current coil driver 112, collectively capable of delivering a predetermined voltage and current, of a given frequency, or range of frequencies, denoted as F, e.g. 60 Hz, to a magnetic field excitation source, such as, for example, electromagnet 116. Electromagnet 116 thereby provides a varying (e.g. periodic, pulsed, etc.) magnetic field having a predetermined frequency F that is directed to an area, such as obscuring medium 118, such that an object 120, such as, a ferrous and/or a nonferrous material, is vibrated by a varying (e.g., periodic) magnetic field and subsequently detected by radar.

Antenna 125 radiates energy from radar sensor radar sensor 126, often an MIR radar sensor, such as described in U.S. Pat. No. 5,361,070 and/or U.S. Pat. No. 5,573,012 as discussed above, and is positioned such that the induced mechanical vibration of object 120, e.g., shown as 2F at the output of MIR 126, may be detected over a predetermined volume 124 aided by the range gating capabilities of radar sensor 126, as denoted by R with the accompanying directional arrow, as shown in FIG. 4. The output of detector 126 is synchronously rectified at rectifying circuit 130, with a frequency doubled output of source 104, denoted as 2F, as produced by a doubler circuit 150. A band-pass filter 154, shown as a dashed square, may additionally be implemented to insure frequency discrimination prior to rectification by rectifying circuit 130. In some implementations, synchronous rectifier 130 may be replaced with a simple non-synchronous diode rectifier, eliminating the need for frequency doubler 150. Frequency doubler 150 may also be replaced with a frequency source that produces other frequencies used to determine correlations with the output spectra of radar sensor 26.

Rectifying circuit 130, such as, for example, a lock-in amplifier is capable of accurately extracting wave functions having predetermined frequency, components. The extracted wave functions are compared with a reference signal, e.g., the doubled output of source 108, to detect a phase difference and amplitude, which serve as predetermined parameters corresponding to these wave functions. Such a rectifying circuit can precisely select and detect only a component having the same frequency as and a predetermined phase relationship with a reference signal from a small repeated signal mixed in noise. The weak input signal is amplified within a narrow band, and the amplified signal is multiplied with the reference signal or synchronously rectified (also called phase sensitive detection), and an integration value, i.e., an output value that can be approximately DC, thereof is output. Any reference signal can be used if it is synchronized with the input signal to be measured, such as, for example, the output frequency of MIR detector 126.

The output of rectifying circuit 130 is then capable of being low-pass filtered by filtering circuit 138 to eliminate any residual harmonic components to provide a steady DC level that indicates the strength of the doubled harmonic signature. As an alternative arrangement, a 2F frequency, e.g., 60 Hz, may drive the synchronous rectifying circuit 130 directly and electromagnet 116 can be driven through a standard digital divide-by-two circuit (not shown) to generate a sine-wave at F=30 Hz. In addition, a normalization circuit 134, i.e., a zero-offset adjust circuit, with an adjustment input shown by the letter Z and an accompanying arrow, can be added in situations where object(s) 120 are examined in a sampling obscuring medium 118. The final output signal, denoted by the letter O, that indicates an object 120 has been detected, can be delivered by low-pass filter 138 to signal processing means, such as, but limited to, a comparator circuit 146 that outputs its signal to an alarm, or an analog indicator 142, that indicates visually the strength of the harmonic mechanical movement produced by a detected excited object 120. Alternatively, output from radar sensor 126 may be coupled to one or more processor apparatus (not shown) for spectral processing or other signal processing means known to those skilled in the art.

The trace as shown in FIG. 2B is taken with an MIR detection bandwidth of about 3 KHz. The synchronous rectifier scheme, as shown in FIG. 4, can be used to reduce the bandwidth to about 1 Hz, and therefore increase a signal-to-noise ratio by about 35 dB. The sensitivity of the MIR sensor itself can be increased by about 25 dB by optimizing radar parameters over the radar used for the laboratory tests of FIG. 2B. Furthermore, the magnetic excitation can be increased by about 30 dB with a stronger electromagnet and by arranging north and south pole pieces such that a uniform field is capable of being produced, e.g., by placing a second electromagnet on the opposite side of region 118. Finally, lowering the frequency of excitation from about 60 Hz down to about 10 Hz results in a larger vibration amplitude on, for example, a ferrous material for the same magnetic field strength, providing about 15 db more signal. In all, about 105 db increased sensitivity can be obtained, so a much smaller metal target of down to about 1 mm in diameter is capable of being detected.

Finally, the system and method has increased sensitivity since the magnetic fields act in a one-way outbound direction only, rather than two-way-out to a metal object and back. The detection range is thus squared since losses due to field strength are reduced from $R^6$ to $R^6$, where R=range from an excitation coil to a hidden object.

It should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for detecting an object, comprising:

mechanically vibrating said object with a varying magnetic field, transmitting a radar signal to the object, receiving a reflected radar signal from the object; and processing the received signal to produce an output signal that corresponds to a harmonic and/or an intermodulation product of said magnetic field.

2. The method of claim 1, wherein said processing includes producing a detection signal from the output signal.

3. The method of claim 1, wherein a swept excitation frequency produces said varying magnetic field.

4. The method of claim 1, wherein said radar signal comprises a UWB impulse radar signal.

5. The method of claim 1, wherein said radar signal comprises a CW radar signal.

6. The method of claim 1, wherein said radar signal comprises a pulsed radar signal.

7. The method of claim 1, wherein said harmonic frequency comprises a second harmonic of said varying field.

8. The method of claim 1, wherein said output signal is capable of being synchronously rectified with a harmonic of said field source.

9. The method of claim 8, wherein said rectified output includes a band-pass filter to produce an output responsive to the strength of said second harmonic.

10. The method of claim 1, wherein said radar signal is range gated.

11. The method of claim 1, wherein said object comprises a ferrous and/or a non-ferrous material capable of having an eddy current induced by said magnetic field.

12. The method of claim 1, wherein said object includes conductive bio-materials.

13. The method of claim 1, wherein said object includes conductive ceramics and conductive explosives.

14. An apparatus for detecting an object, comprising:

a varying magnetic field source to mechanically vibrate said object, a radar transmitter for transmitting radar signals to said object, a radar receiver capable of detecting reflected radar signals from said object, a processor to produce output signals from the received radar signals that is responsive to a harmonic and/or an intermodulation product of said varying magnetic field.

15. The apparatus of claim 14, wherein a detection signal is capable of being produced from said output signal.

16. The apparatus of claim 14, wherein a swept excitation frequency produces said varying magnetic field.

17. The apparatus of claim 14, wherein said radar signal comprises a UWB impulse radar signal.

18. The apparatus of claim 14, wherein said radar signal comprises a CW radar signal.

19. The apparatus of claim 14, wherein said radar signal comprises a pulsed radar signal.

20. The apparatus of claim 14, wherein said harmonic frequency comprises a second harmonic of said varying magnetic field source.

* * * * *